United States Patent [19]

Wuenscher

[11] Patent Number: 5,388,941
[45] Date of Patent: Feb. 14, 1995

[54] SEAL NUT FOR POWER STEERING ASSEMBLY

[75] Inventor: Bernd F. Wuenscher, Lebanon, Tenn.
[73] Assignee: TRW Inc., Lyndhurst, Ohio
[21] Appl. No.: 194,834
[22] Filed: Feb. 9, 1994
[51] Int. Cl.6 ............ F16B 33/00; F16B 43/02; F16L 17/00; B65D 45/00
[52] U.S. Cl. .................. 411/369; 411/303; 411/542
[58] Field of Search ............ 411/303, 304, 369, 542, 411/915; 285/108, 113, 343, 339; 220/327

[56] References Cited

U.S. PATENT DOCUMENTS

| | | |
|---|---|---|
| 445,469 | 1/1891 | Harvey . |
| 2,001,290 | 5/1935 | Thomson . |
| 2,326,681 | 8/1943 | Richardson ............ 411/303 |
| 3,203,459 | 8/1965 | Coldren ............ 411/303 X |
| 3,316,952 | 5/1967 | Hollinger . |
| 3,635,272 | 1/1972 | Scheffer ............ 411/303 |
| 3,797,547 | 3/1974 | Shiwjo ............ 411/303 |
| 4,004,626 | 1/1977 | Biblin et al. ............ 411/303 X |
| 4,367,060 | 1/1983 | Berecz ............ 411/303 |
| 4,773,303 | 9/1988 | Stroud . |

FOREIGN PATENT DOCUMENTS

| | | | |
|---|---|---|---|
| 3537867 | 5/1987 | Germany ............ 411/303 |

Primary Examiner—Neill R. Wilson
Attorney, Agent, or Firm—Tarolli, Sundheim & Covell

[57] ABSTRACT

A seal nut (10) provides a seal between a housing (14) having an opening (62) and a threaded member (60) having an axis (84) and a portion (196) received in the opening and a threaded portion (198) projecting from the housing. The seal nut includes a metal nut (72) and a deformable insert (74) movable with the nut. The nut has a main body portion (76) threaded on the threaded member. The nut has a plurality of circumferentially spaced tongues (92, 94, 98, 102) projecting axially from the main body portion and defining between them a plurality of slots (96, 100, 104, 106). The seal nut has a first position on the threaded member in which the nut (72) is spaced apart from the housing (14) and the tongues are undeformed. The seal nut has a second position on the threaded member in which the tongues (92, 94, 98, 102) are in engagement with the housing and are deformed radially inward, and in which the deformable insert (24) has a first portion (214) disposed in the slots and a second portion (210) disposed in fluid-tight engagement with the housing. In a preferred embodiment, the seal nut (10) seals between a power steering gear housing (14) and an adjusting screw (60) threaded into an opening (62) in the housing. The seal nut (10) blocks fluid flow out of the opening in the housing.

18 Claims, 5 Drawing Sheets

SEAL NUT FOR POWER STEERING ASSEMBLY

BACKGROUND OF THE INVENTION

1. Technical Field

The present invention relates to a seal nut. In particular, the present invention relates to a seal nut for blocking fluid flow through an opening extending from a pressure chamber in a fluid power assist steering gear.

2. Description of the Prior Art

Fluid power assist steering gears for vehicles are known. One such steering gear is disclosed in U.S. Pat. No. 4,773,303 and includes a piston which moves axially in a fluid pressure cheer. The piston is connected through a pitman arm with the steerable wheels of the vehicle. The steerable wheels, at the end of their range of movement, engage steering stops on the vehicle.

It is important to relieve fluid pressure in the chamber prior to engagement of the steerable wheels with the steering stops. Relieving the pressure protects the power steering pump and other parts of the steering gear and steering linkage from damage.

The steering gear disclosed in U.S. Pat. No. 4,773,303 includes poppet valves on the piston which are operative to relieve the fluid pressure Just prior to the steerable wheels reaching their limit of movement. An opening extends through a wall of a housing of the power steering gear, between the pressure chamber and an outer surface of the housing. An adjusting screw is threaded in the opening and has a portion projecting into the pressure chamber. The adjusting screw is movable axially relative to the housing to adjust the position of the poppet valves. A jam nut is threaded onto a portion of the adjusting screw which projects outwardly from the outer surface of the housing. The jam nut engages the housing outer surface to prevent the adjusting screw from moving from the adjusted position.

The inner end of the adjusting screw, and the inner end of the opening in the housing wall, are exposed to the pressure of the power steering fluid in the pressure chamber. This pressure can be as much as 5,000 psi. Power steering fluid under this pressure may tend to flow outwardly through the opening to the outer surface of the power steering gear. It is desirable to block fluid flow through the opening in the housing wall to prevent loss of fluid from the pressure cheer in the power steering gear.

SUMMARY OF THE INVENTION

The present invention is a seal nut for providing a seal between a housing having an opening and a threaded member in threaded engagement with the housing. The threaded member has an axis and a portion received in the opening and a threaded portion projecting from the housing. The seal nut includes a nut and a deformable insert movable with the nut. The nut has a main body portion threaded on the threaded member. The nut also has a plurality of circumferentially spaced tongues projecting axially from the main body portion and defining between them a plurality of slots. The tongues are deformable radially inward upon engagement with the housing. The seal nut has a first position on the threaded member in which the nut is spaced apart from the housing and the tongues are disposed in a first radially outward undeformed condition. The seal nut is movable on the threaded member from the first position to a second position in which the tongues are in engagement with the housing and are disposed in a second condition deformed radially inward from the first condition. When the seal nut is in the second position, the deformable insert has a first portion disposed in the slots in the nut and a second portion disposed in fluid-tight engagement with the housing.

The present invention is also a method of sealing an opening in a housing in which is disposed a threaded member having an axis and a first portion disposed in the opening in the housing and a second portion projecting outward from the housing. The method includes the steps of providing a nut having a main body portion and a plurality of circumferentially spaced deformable tongues projecting axially from the main body portion and defining between them a plurality of slots; fitting at least a portion of a deformable insert into a cavity in the nut; moving the nut axially on the threaded member in a first direction toward the housing until the deformable tongues engage the housing and deform radially inward toward the second portion of the externally threaded member, The step of moving the nut includes flowing a first portion of the insert into the slots on the nut between the tongues and flowing a second portion of the insert into fluid-tight engagement with the housing.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF A PREFERRED EMBODIMENT OF THE INVENTION

Figure 1:
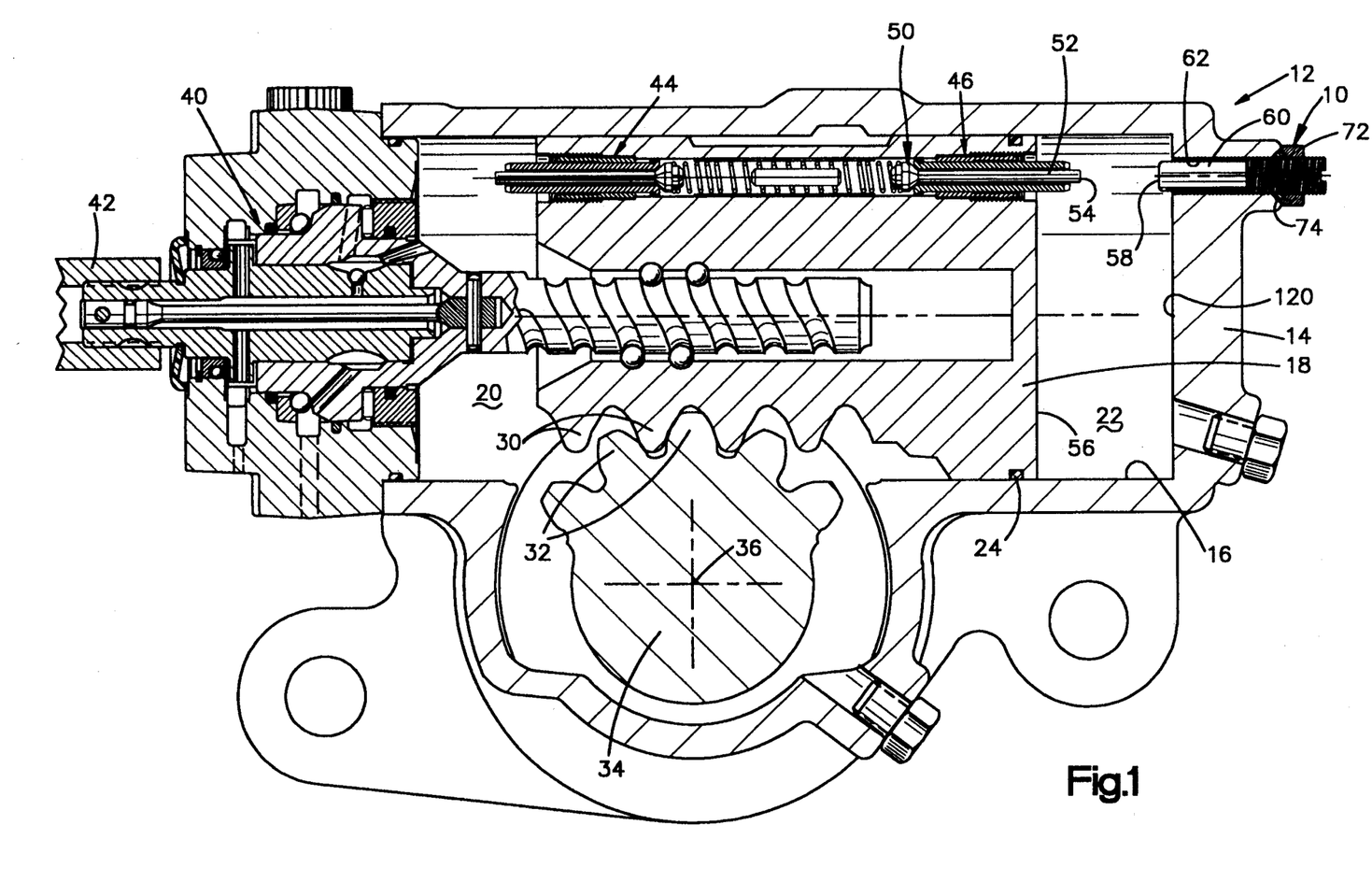
FIG. 1 is a cross-sectional view of a fluid power assist steering gear having a seal nut in accordance with the present invention which includes a metal nut and a deformable insert.

The present invention relates to a seal nut and particularly to a seal nut for use in a fluid power assist steering gear. The present invention is applicable to various seal nut constructions. As representative of the present invention, FIG. 1 illustrates a seal nut 10. The seal nut 10 is part of a fluid power assist steering gear 12 for use in a vehicle. The steering gear 12 is of the type described in U.S. Pat. No. 4,773,303, the disclosure of which is hereby incorporated by reference.

The steering gear 12 includes a housing 14. The housing 14 defines a fluid chamber 16. A piston 18 is located in the fluid cheer 16. The piston 18 divides the fluid chamber 16 into a pair of chamber portions 20 and 22. A seal 24 on the piston 18 prevents fluid leakage between the chamber portions 20 and 22.

A plurality of gear teeth 30 on the piston 18 mesh with gear teeth 32 on a sector gear 34. The sector gear 34 is supported on the housing 14 for pivotal movement about an axis 36. The sector gear 34 is connected with a part of a steering linkage mechanism (not shown), such as a known Pitman arm, to turn the steerable wheels of the vehicle upon pivoting of the sector gear about the axis 36.

A fluid flow control valve 40 of a known construction controls the pressurization and venting of the chamber portions 20 and 22. The valve 40 is connected to a steering input shaft 42 of the vehicle. The steering input shaft 42 is connected to the steering wheel of the vehicle to actuate the valve 40 in response to rotation of the steering wheel. Upon rotation of the steering input shaft 42, pressurized fluid at up to 5,000 psi is directed into one chamber portion 20 or 22 while the other chamber portion 22 or 20 is vented. This selective pressurization and venting of the chamber portions 20 and 22 moves the piston 18 axially within the fluid chamber 16 in a work stroke. Axial movement of the piston 22 pivots the sector gear 46 to turn the steerable wheels of the vehicle.

In order to stop movement of the piston 18 at the ends of the piston work stroke, prior to engagement of the steerable wheels with their stops, a pair of fluid pressure relief popper valves 44 and 46 are provided. The poppet valves 44 and 46 are carried by the piston 18 at axially opposite ends of the piston. Each poppet valve 44 and 46 vents fluid pressure in its respective chamber portion 20 or 22 just prior to the piston 18 reaching an end of the work stroke. As a result, the power steering pump (not shown), the teeth 30 on the piston 18 and the teeth 32 on the sector gear 34 are protected from excessive hydraulic and mechanical loads which may be transmitted through the steering gear 12.

The poppet valve 46 includes a valve member 50 having a valve stem 52. An end portion 54 of the valve stem 52 projects axially past the end 56 of the piston 18. The valve stem end portion 54 is engageable with an inner end portion 58 of a movable adjusting screw 60, to adjust the poppet valves 44 and 46 in a manner as described in the aforementioned U.S. Pat. No. 4,773,303.

The adjusting screw 60 is threadedly received in an adjusting screw opening 62 in the steering gear housing 14. The opening 62 extends between the fluid chamber 16 and an outside surface 64 of the housing 14. Rotation of the adjusting screw 60 in the opening 62 moves the adjusting screw axially relative to the housing 14. The seal nut 10 is threaded on the adjusting screw 60. The seal nut 10, when tightened against the housing 14, blocks rotation of the adjusting screw 60 relative to the housing. The seal nut 10 also blocks flow of power steering fluid out of the fluid chamber 16 through the opening 62.

The seal nut 10 includes a nut 72 and a deformable insert 74. The nut 72 (FIGS. 2 and 3) is preferably made of metal such as a grade 2 mild carbon steel. The nut 72 includes a main body portion 76 (FIG. 3) having a generally cylindrical wall 78 which defines a central opening 80 of the nut 72. The nut main body portion 76 preferably has a standard hex nut configuration with an inner peripheral thread 86 extending around an axis 84. A tapered wall 88 extends axially between the thread 86 and a tongue portion 90 of the nut 72.

Figure 2:
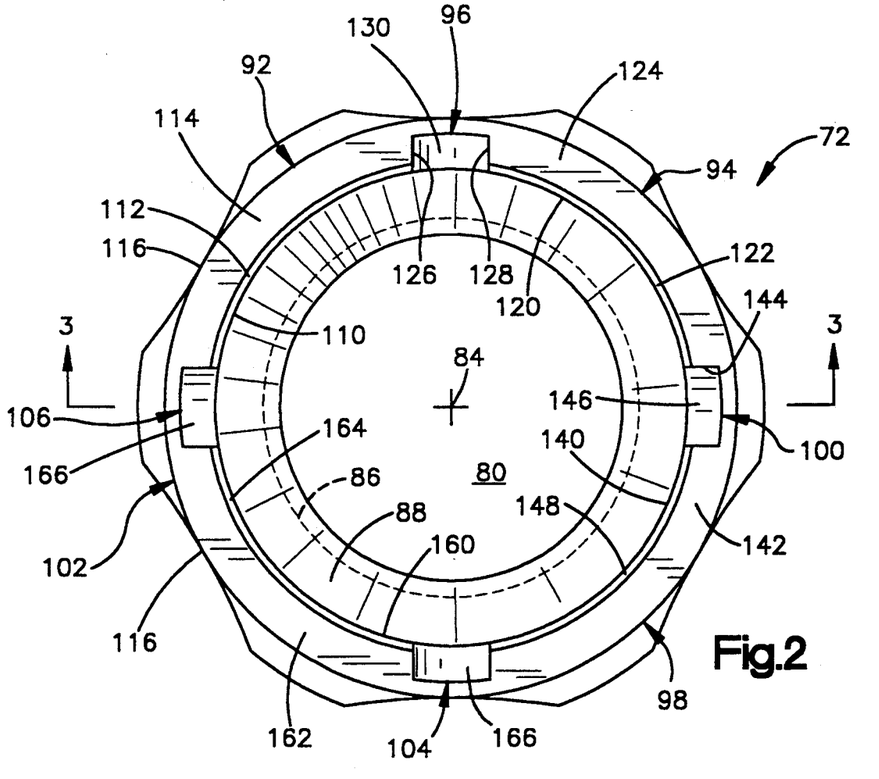
FIG. 2 is a top plan view of the metal nut of FIG. 1.
Figure 3:
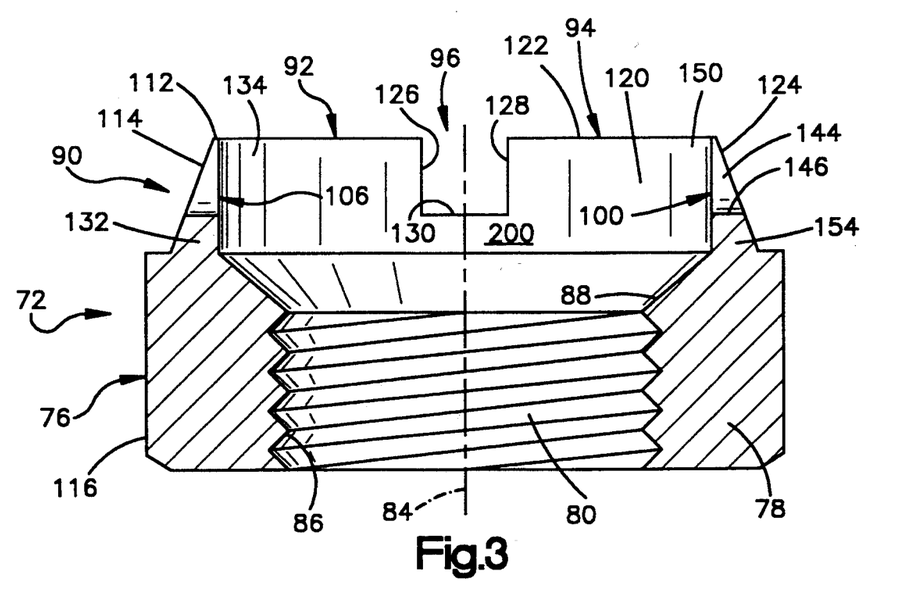
FIG. 3 is a view taken along line 3—3 of FIG. 2.

The tongue portion 90 includes four identical tongues which project axially from the main body portion 76 and which are separated from each other by four identical axially extending slots. The tongue portion 90 includes a first tongue 92 and a second tongue 94 which define between them and are separated by a first slot 96. The second tongue 94 and a third tongue 98 define between them and are separated by a second slot 100. The third tongue 98 and a fourth tongue 102 define between them and are separated by a third slot 104. The fourth tongue 102 and the first tongue 92 define between them and are separated by a fourth slot 106. Each tongue 92, 94, 98, and 102 has a circumferential extent equal to 90° less the circumferential extent of one of the slots.

The first tongue 92 has a tapered cross-sectional configuration as best seen in FIG. 3. The first tongue 92 thus decreases in thickness from its base portion 132 adjacent to the nut main body portion 76 to its axial end portion 134. The first tongue 92 has an inner major side surface 110 (FIG. 2) which extends from the tapered wall 88 of the nut main body portion 76 parallel to the axis 84. The inner side surface 110 terminates at an axial end surface 112 of the tongue 92. An outer major side surface 114 of the tongue 92 extends both radially outward and axially between the end surface 112 and an outer surface 116 of the nut main body portion 76.

The second tongue 94 is identical in structure to the first tongue 92. The second tongue 94 has a tapered cross-sectional configuration, with a radially narrow axially outer end portion 150 and a radially thick base portion 154. The second tongue 94 has an inner major side surface 120 which extends from the tapered wall 88 in a direction parallel to the axis 84. The inner side surface 120 terminates at an end surface 122 (FIG. 2) of the end portion 150 of the second tongue 94. An outer major side surface 124 of the second tongue 94 extends both radially outward and axially between the end surface 122 and the outer surface 116 of the nut main body portion 76.

The first slot 96 separates the first and second tongues 92 and 94. The circumferential extent of the first slot 96 is defined by an axially extending side surface 126 of the first tongue 92 and a parallel axially extending side surface 128 of the second tongue 94. The slot 96 has a radially extending bottom wall surface 130. The axial extent of the slot 96 is less than the axial extent of the first and second tongues 92 and 94.

The third tongue 98 is identical in structure to the first and second tongues 92 and 94. The third tongue 98 also has a tapered cross-sectional configuration. The third tongue 98 has an inner major side surface 140 (FIG. 2) which extends parallel to the axis 84, an outer major side surface 142, and an axially outer end portion 148. The second slot 100 is disposed between the third tongue 98 and the second tongue 94. The second slot 100 is partially defined by an axially extending side surface 144 of the second tongue 94. The second slot 100 has a bottom wall 146.

The fourth tongue 102 is identical in structure to the tongues 92, 94 and 98. The fourth tongue 102 has an inner major side surface 160 which extends parallel to the axis 84, an outer major side surface 162, and an axially outer end portion 164. The third slot 104 separates the third and fourth tongues 98 and 102. The third slot 104 has a bottom wall surface 160. Similarly, the fourth slot 106 separates the fourth and first tongues 102 and 92. The fourth slot 106 has a bottom wall surface 166.

Figure 5:
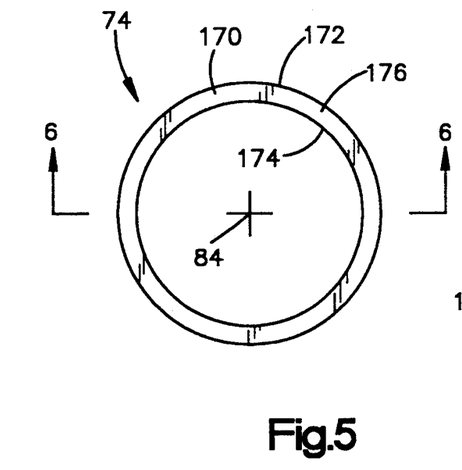
FIG. 5 is a top plan view of the deformable insert of FIG. 1.
Figure 6:
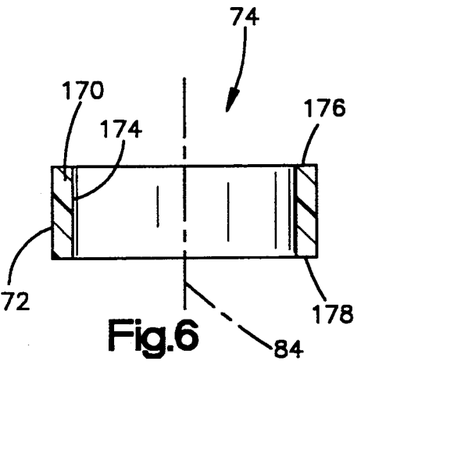
FIG. 6 is a view taken along line 6—6 of FIG. 5.

The deformable insert 74 (FIGS. 5 and 6) has a ring-shaped or annular configuration as defined by a wall 170 made of a deformable material. The deformable insert 74 is preferably made of a polymeric material such as recycled Teflon ® brand polytetrafluoroethylene obtainable from Tri-Dayton Company of Dayton, Ohio. The insert 74 has a circumferential outer side surface 172 which extends parallel to the axis 84. The insert 74 has a circumferential inner side surface 174 which extends parallel to the axis 84. The insert 74 has a pair of parallel radially extending annular end walls 176 and 178 which interconnect the side surfaces 172 and 174.

The steering gear housing 14 (FIGS. 1, 4 and 7) has an outer surface portion 190 with a tapered or conical configuration. The conical surface 190 defines a cavity 192 in the end face 64 of the housing 14. The cavity 192 is in the nature of a countersink surrounding the adjusting screw opening 62. The conical surface 190 and the cavity 192 both have a diameter relative to the axis 84 which is greatest at the end face 64 and which is least where the conical surface 190 intersects the threaded opening 62 in the housing 14. At that line of intersection, the conical surface 190 and the cavity 192 have the same diameter as the opening 62.

Figure 4:
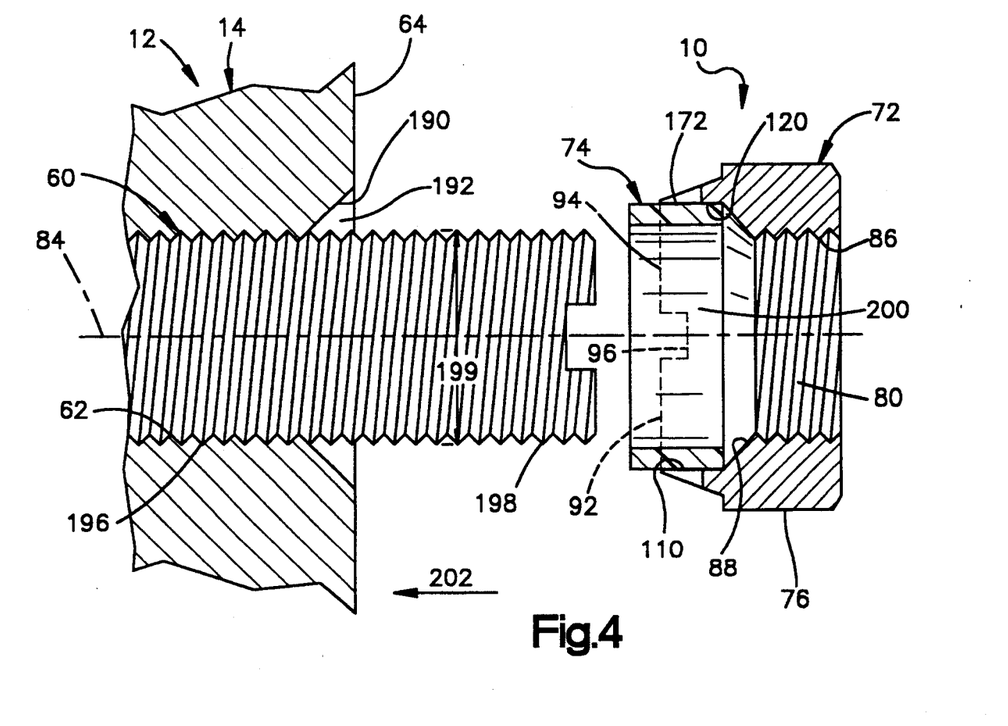
FIG. 4 is an enlarged sectional view of a portion of the steering gear of FIG. 1 showing the seal nut spaced from the steering gear.

FIG. 4 illustrates parts of the steering gear 12 during the initial assembly of the steering gear, or during assembly of a new seal nut 10 to a previously assembled steering gear, that is, prior to any sealing engagement of the seal nut with the housing 14. A first portion 196 of the adjusting screw 60 is threadedly received in the adjusting screw opening 62 in the housing 14. A threaded second portion 198 of the adjusting screw 60 projects outwardly from the conical outer surface 190 of the housing 14. The threaded member portion 198 has a major diameter as indicated by the arrow 199. The seal nut 10 including the nut 72 and the insert 74 is in a first position spaced from the housing 14 and from the adjusting screw 60.

The insert 74 is first put together with or connected for movement with the nut 72 when the seal nut 10 is to be threaded on the adjusting screw 60 for the first time. The tongue portion 90 of the nut 72 forms a cavity 200 which is the volume of space disposed radially inward of the inner side surfaces 110, 120, 140, and 160 of the tongues 92, 94, 98, and 102, respectively. At least a portion of the insert 74 is moved axially into the cavity 200. An interference fit is formed between the annular outer surface 172 of the insert 74 and the inner peripheral surfaces 110, 120, 140, and 160 of the nut 72. The parts are then in a first position shown in FIG. 4.

The interference fit between the nut 72 and the insert 74 is sufficient to hold the insert for movement with the nut when the seal nut 10 is threaded onto the adjusting screw 60. Thus, the nut 72 and the insert 74 need not be assembled to each other during the process of manufacturing the nut, as is typical with a standard lock nut.

Figure 7:
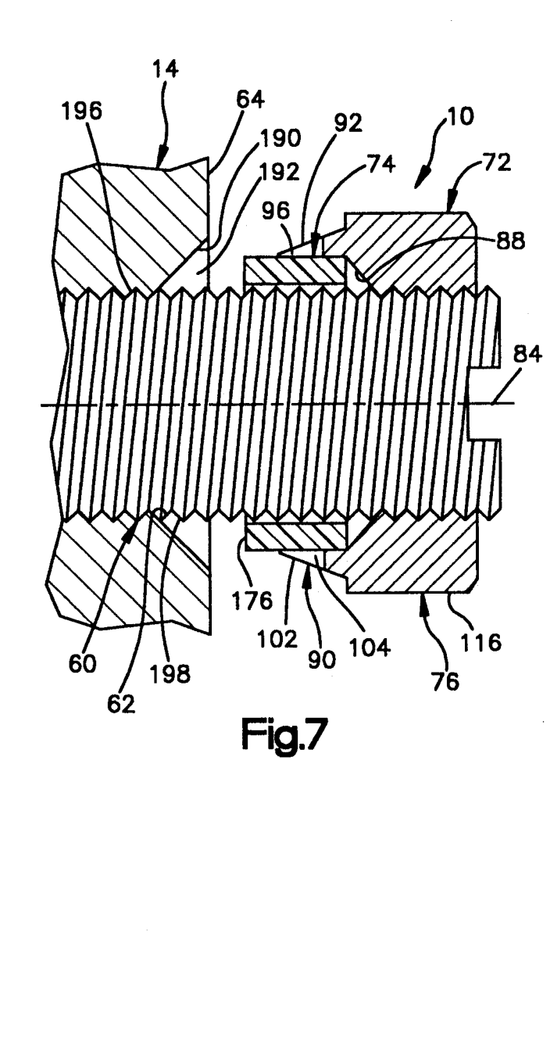
FIG. 7 is a view similar to FIG. 4 showing the seal nut threaded on an adjusting screw of the steering gear and prior to engagement with the housing.
Figure 8:
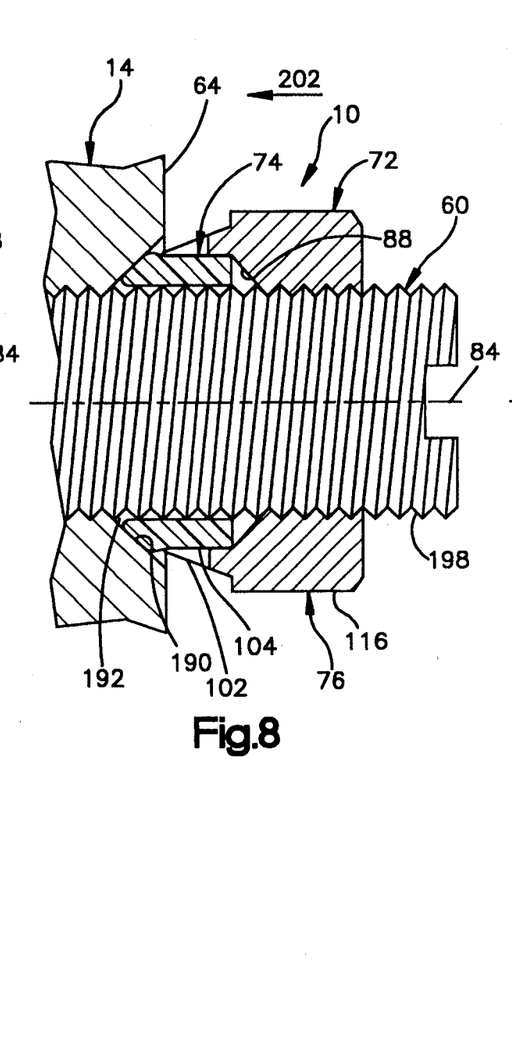
FIG. 8 is a view similar to FIG. 7 showing the initial engagement between the seal nut and the housing.
Figure 9:
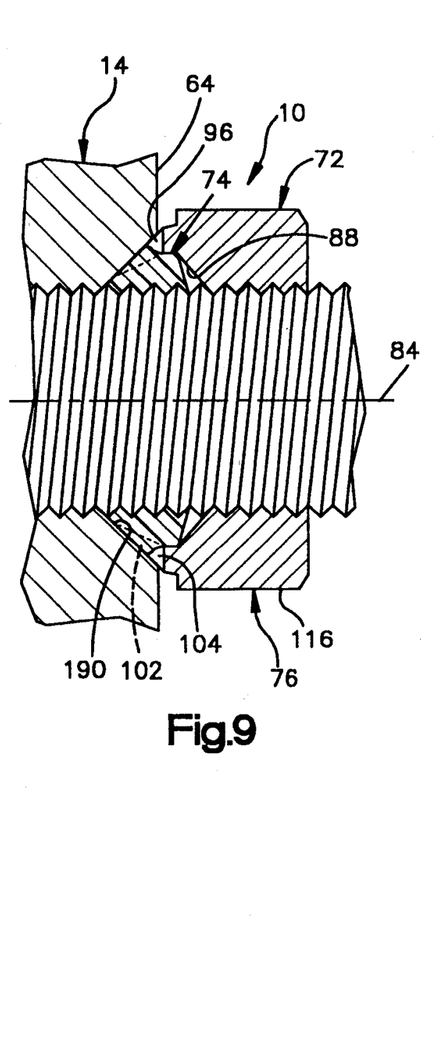
FIG. 9 is a view similar to FIG. 8 taken through one of the slots of the metal nut and showing the seal nut in sealing engagement with the housing.
Figure 10:
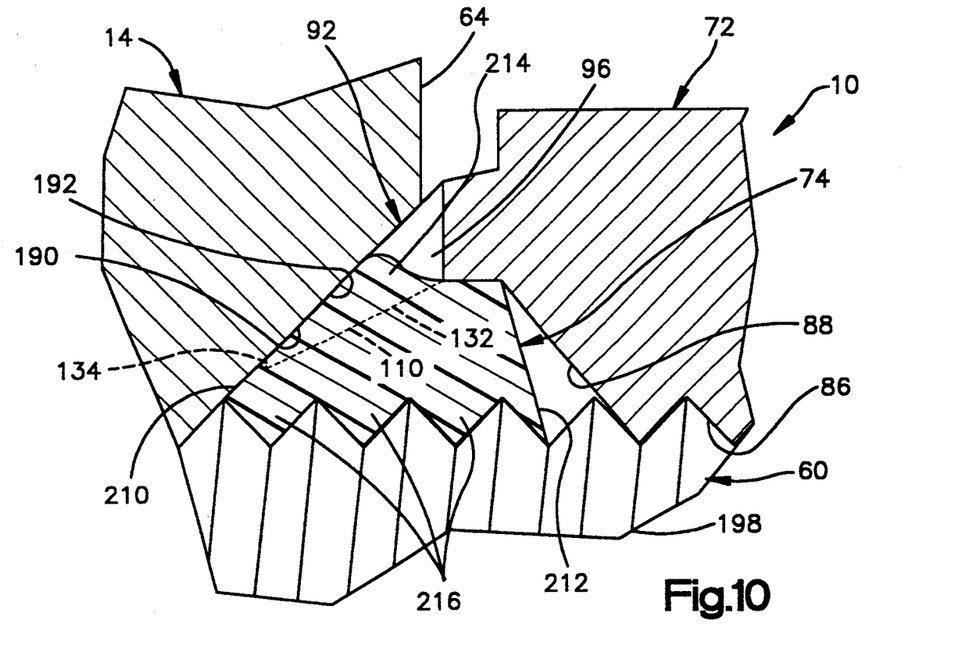
FIG. 10 is an enlarged view of a portion of FIG. 9.
Figure 11:
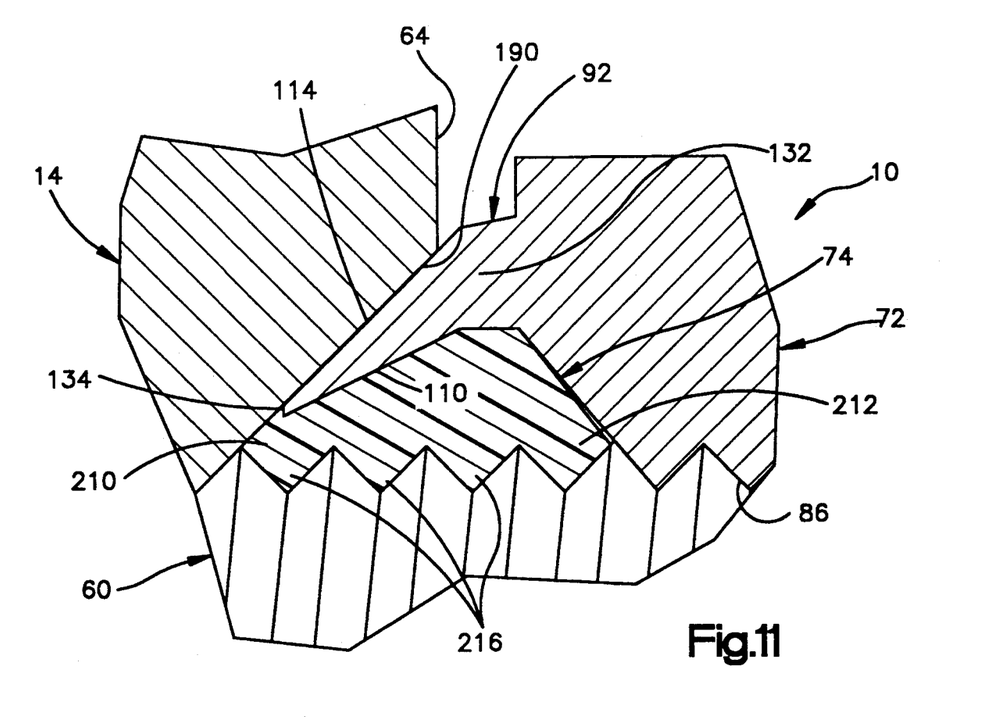
FIG. 11 is a view similar to FIG. 10 taken through one of the tongues of the metal nut.

The seal nut 10 is then moved from the first position shown in FIG. 4, through intermediate positions shown in FIGS. 7 and 8, to a second position in sealing engagement with the housing 14 as shown in FIGS. 9-11. In this process, the seal nut 10 including the nut 72 and the insert 74 is threaded onto the projecting portion 198 of the adjusting screw 60. The thread 86 on the main body portion 76 of the nut 72 engages the threaded adjusting screw portion 198. The nut 72 is rotated about the axis 84 to move the seal nut 10 axially toward the housing 14 in a direction as indicated by the arrow 202 (FIGS. 4 and 8).

The inner diameter of the insert 74 is greater than the major diameter 199 of the adjusting screw 60. Therefore, the insert 74 does not engage or contact the adjusting screw 60 while the seal nut 10 is being rotatably moved toward the housing 14 and prior to any portion of the seal nut engaging the housing.

As the seal nut 10 moves toward the housing 14, the deformable insert 74 is the first portion of the seal nut which engages the housing 14, as illustrated in FIG. 8. Then, as the seal nut 10 moves further in the direction 202 towards the housing 14, the metal nut 72 engages the housing 14 as illustrated in FIGS. 9-11. The engagement of the nut 72 with the housing 14 will be described first, for purposes of clarity.

The axial end portions 134, 123, 148 and 164 of the tongues 92, 94, 98 and 102 are the first portions of the metal nut 72 to engage the conical surface 190 of the housing 14. The engagement of the tongue end portions with the conical surface 190, while the nut 72 is moving axially toward the housing, bends or deforms the tongues 92, 94, 98 and 102 radially inward toward the axis 84. This deformation continues, and the tongues 92, 94, 98 and 102 bend or deform progressively more and more, as the nut 72 is threaded further along the adjusting screw 60 in the direction 202. The tongues 92, 94, 98 and 102 move progressively from a first radially outward and undeformed condition shown in FIGS. 4, 7 and 8 to a second radially inward and deformed condition shown in FIGS. 9-11. The tongue outer side surfaces 114, 124, 142 and 162 are in abutting engagement with the conical surface 190 of the housing 14.

When the seal nut 10 is in its second position in fluid-tight engagement with the housing 14 as shown in FIGS. 9-11, the axially outer end portions 134, 150, 148 and 164 of the tongues are closer to the axis 84 than are the base portions of the tongues. For example, the axially outer end portion 134 (FIG. 10) of the first tongue 92 is closer to the axis 84 than is the base portion 132 of the first tongue. Similarly, the end portion 150 of the second tongue 94 is closer to the axis 84 than is the base portion 154 of the second tongue. The third and fourth tongues 98 and 102 are similarly deformed. The inwardly deformed end portions of the tongues 92, 94, 98 and 102 thus define a circle having a diameter which is smaller than the diameter of the circle defined by the base portions of the tongues.

During movement of the seal nut 10 from the first position shown in FIG. 4 to the second position shown in FIGS. 9-11, the deformable insert 74 deforms both axially and radially. A first portion 210 (FIGS. 10 and 11) of the plastic insert 74, which is the insert position closest to the housing 14, flows axially and radially into the conical cavity 192 of the housing. The first insert portion 210 forms a ring-shaped body of plastic material which engages the conical surface 190 of the housing 14 for 360° circumferentially around the axis 84 and around the adjusting screw 60.

A second portion 212 of the plastic insert 74 flows axially and radially to engage the tapered wall 88 of the nut 72. A third portion 214 of the plastic insert 74 flows radially outward at four locations into and through the slots 96, 100, 104, and 106 of the nut 72, between the tongues 92, 94, 98 and 102. A fourth portion 216 of the plastic insert 74 flows radially inward of the major diameter 199 of the adjusting screw portion 198. The fourth portion 216 of the insert 74 engages and surrounds the thread of the adjusting screw portion 198 for 360° circumferentially around the axis 84 and the adjusting screw 60.

The various portions of the deformable insert 74 fill the voids between the nut 72, the adjusting screw 60 and the housing 14, sufficiently to block flow of fluid out of the pressure chamber 16 (FIG. 1) of the steering gear 12 through the adjusting screw opening 62. The insert portion 210 seals between the housing 14 and the adjusting screw 60. The insert portion 212 seals between the nut 72 and the adjusting screw 60. The insert portion 214 seals between the nut 72 and the housing 14. The insert portion 216 seals against the adjusting screw 60.

Because the third portion 214 of the insert 74 is disposed within the slots in the nut 72, between the tongues, the insert is captured or locked to the nut. Thus, the insert 74 is fixed for rotation with the nut 72. The seal nut 10 is thereby reusable. When the nut 72 is loosened from engagement with the housing 14 to enable adjustment of the screw 60, the plastic insert 74 moves with the nut away from the housing. When the nut 72 is again moved into engagement with the housing 14, the deformable insert 74 moves with the nut into engagement with the housing to seal against the housing.

The plastic insert 74 also helps lock the nut 72 to the projecting portion 198 of the adjusting screw 60. This is because the fourth portion 216 of the plastic insert 74 is pressed tightly against the screw thread on the adjusting screw 60, while the third portion 214 of the insert is interlocked with the nut 72.

The radially inward bending or deformation of the tongues 92, 94, 98 and 102 helps to capture the insert 74 better than if the tongues remained parallel to the axis 84. Also, the radially inward bending of the tongues squeezes the insert 74 axially and radially to increase the degree by which the material of the insert flows upon deformation. This ensures that sufficient material of the insert 74 can be forced into engagement with the screw thread on the adjusting screw 60. The radially inward bending of the tongues 92, 94, 98 and 102 also minimizes axial movement of the insert 74 relative to the nut 72, since the inner side surfaces 110, 120, 140 and 160 of the tongues extend at an acute angle to the axis 84 and thus direct some axial force on the insert 74.

It typically is not necessary to deform the tongues of the nut 72 farther inwardly when the seal nut 10 is loosened and then retightened. This is because the preferred material for the insert 74, tetrafluoropolyethylene, is somewhat elastic and relaxes slightly when the force on it is relieved. The material of the insert 74 tends to flow slightly back toward its original undeformed condition when the nut 72 is loosened from engagement with the housing 14. The plastic material of the insert 74 then flows back to its deformed condition when the seal nut 10 is again tightened down against the housing 14. Thus, it typically is not necessary to deform the tongues of the nut 72 farther inwardly when the seal nut 10 is loosened and then retightened.

Typically, the axially outer end portions of the tongues 92, 94, 98 and 102 are not deformed inwardly so much that they engage each other. If necessary, however, the nut 72 can be threaded farther into engagement with the housing 14 to bend the tongues 92, 94, 98 and 102 farther radially inwardly. This forces more material of the plastic insert 74 into the voids in the system, that is, into the housing cavity 200, the slots 96, 100, 104 and 106 of the nut 72, and the volume radially inward of the tapered wall 88 of the nut. Accordingly, the seal nut 10 of the present invention does not rely solely on the plasticity or ductility of the deformable insert 74 to provide the capability of reuse.

From the above description of the invention, those skilled in the art will perceive improvements, changes and modifications in the invention. Such improvements, changes and modifications within the skill of the art are intended to be covered by the appended claims.

Having described the invention, the following is claimed:

1. A seal nut for providing a seal between a housing having an opening and a threaded member in threaded engagement with the housing, the threaded member having an axis and a first portion received in the opening and a second portion projecting from the housing, said seal nut comprising a nut and a deformable insert movable with said nut;

said nut having a main body portion threaded on the threaded member;

said nut having a plurality of circumferentially spaced tongues projecting axially from said main body portion, said tongues defining between them a plurality of slots, said tongues being deformable radially inward upon engagement with said housing;

said seal nut having a first position on the threaded member in which said nut is spaced apart from said housing and said tongues are disposed in a first radially outward undeformed condition;

said seal nut being movable on the threaded member from the first position to a second position in which said tongues are in engagement with said housing and are disposed in a second condition deformed radially inward from said first condition and in which said deformable insert has a first portion disposed in said slots and a second portion disposed in fluid-tight engagement with said housing.

2. A seal nut as set forth in claim 1 wherein said deformable insert comprises a deformable annular member received radially inwardly of said tongues, said member having an inner periphery with a diameter greater than a major diameter of the threaded member when said seal nut is in the first position.

3. A seal nut as set forth in claim 1 wherein an annular outer surface of said deformable insert is disposed in frictional engagement with said nut to hold said insert for movement with said nut and an annular inner surface of said deformable insert is spaced radially outward of the major diameter of the threaded member to enable free movement of said insert over the threaded member when said seal nut is moved from the first position toward the second position.

4. A seal nut as set forth in claim 3 wherein said deformable insert has a third portion disposed radially inward of the threaded member major diameter and in engagement with the threaded member when said seal nut is in the second position.

5. A seal nut as set forth in claim 1 wherein each one of said tongues has a base portion adjacent said nut main body portion and an axial end portion, said tongue axial end portions being disposed at a first distance from the axis when said tongues are in the first condition and said tongue axial end portions being disposed at a second distance from the axis which is less than the first distance when said tongues are in the second condition.

6. A seal nut as set forth in claim 5 wherein each of said tongue base portions has a radial thickness greater than the radial thickness of said axial end portions.

7. A seal nut as set forth in claim 5 wherein said deformable insert has an annular outer surface disposed in frictional engagement with said nut to hold said insert for movement with said nut, said insert having an annular inner surface spaced radially outward of the major diameter of the threaded member to enable free movement of said insert over the threaded member when said seal nut is in the first position, said deformable insert having a third portion disposed radially inward of the threaded member major diameter and in engagement with the threaded member when said seal nut is in the second position.

8. An apparatus comprising:
a housing having a fluid chamber and an outer surface and an opening extending between said fluid chamber and said outer surface;
a threaded member having an axis and a first portion received in said opening in said housing and a second portion projecting axially from said outer surface of said housing, said second portion having a major diameter; and
a seal nut including a nut and a deformable insert;
said nut having a main body portion threaded on said second portion of said threaded member;
said nut having a plurality of circumferentially spaced tongues projecting axially from said main body portion and defining between them a plurality of slots, said tongues being deformable radially inward upon engagement with said housing;
said seal nut being movable on said second portion of said threaded member from a first position in which said nut is spaced apart from said outer surface of said housing and said deformable tongues of said nut are disposed in a first radially outward undeformed condition, to a second position in which said tongues are in engagement with said outer surface of said housing and are disposed in a second condition deformed radially inward from said first condition;
said deformable insert being movable with said nut on said threaded member and having a first portion disposed in said slots and a second portion disposed in fluid-tight engagement with said housing outer surface when said seal nut is in the second position.

9. An apparatus nut as set forth in claim 8 wherein said housing defines a pressure chamber containing power steering fluid under pressure, said apparatus including a pressure relief valve disposed in said housing, said threaded member being rotatable in said opening relative to said housing to adjust said pressure relief valve, said seal nut blocking flow of power steering fluid out of said pressure chamber through said opening.

10. An apparatus as set forth in claim 8 wherein said housing outer surface comprises a conical surface surrounding said opening and defining a conical cavity of said housing, said tongues engaging said conical surface when said seal nut is in the second position.

11. An apparatus as set forth in claim 8 wherein said threaded member has a major diameter, said insert having an annular outer surface disposed in frictional engagement with said nut to hold said insert for movement with said nut when said nut is in the first position and having an annular inner surface spaced radially outward of said major diameter of said threaded member to enable free movement of said insert over said threaded member when said seal nut is in the first position.

12. An apparatus as set forth in claim 8 wherein said insert has a third portion disposed radially inward of said threaded member major diameter and in engagement with said threaded member when said seal nut is in the second position.

13. An apparatus as set forth in claim 8 wherein each one of said tongues has a base portion adjacent said nut main body portion and an axial end portion, said tongue end portions being disposed at a first distance from the axis when said tongues are in the first condition and said tongue end portions being disposed at a second distance from the axis less than the first distance when said tongues are in the second condition.

14. A method of sealing an opening in a housing in which is disposed a threaded member having an axis and a first portion disposed in the opening and a second portion projecting outward from the housing, said method comprising the steps of:
providing a nut having a main body portion and a plurality of circumferentially spaced deformable tongues projecting axially from the main body portion and defining between them a plurality of slots;
fitting at least a portion of a deformable insert into a cavity in the nut; and
moving the nut axially on the threaded member in a first direction toward the housing until the deformable tongues engage the housing and bend radially inward toward the externally threaded member;
said step of moving the nut including flowing a first portion of the insert into the slots on the nut between the tongues and flowing a second portion of the insert into fluid-tight engagement with the housing.

15. A method as set forth in claim 14 wherein said step of fitting a deformable insert into a cavity in the nut includes creating an interference fit between an annular outer surface of the insert and an inner peripheral surface of the nut.

16. A method as set forth in claim 14 wherein said step of moving the nut includes progressively bending axially outer end portions of the tongues radially inward toward the adjusting screw by engaging the deformable tongues with a tapered surface of the housing.

17. A method as set forth in claim 14 wherein said step of moving the nut includes flowing a third portion of the insert radially inward into engagement with the threaded member.

18. A method as set forth in claim 14 wherein said step of moving the nut includes deforming the tongues radially inward toward the threaded member by a first amount, said method thereafter including the steps of:
moving the nut and insert on the threaded member in a second direction opposite to the first direction;
moving the adjusting screw relative to the housing to adjust the position of a valve in the housing; and
moving the nut on the threaded member in the first direction to deform the tongues radially inward toward the threaded member by a second amount greater than the first amount.

* * * * *